US009626461B2

(12) United States Patent
Moreau

(10) Patent No.: US 9,626,461 B2
(45) Date of Patent: Apr. 18, 2017

(54) METHOD FOR CREATING PERSONALIZED FUNCTIONAL OBJECTS, COMPUTER, COMPUTER READABLE MEDIUM AND COMPUTER PROGRAM RELATED THERETO

(75) Inventor: Clément Moreau, Clamart (FR)

(73) Assignee: SCULPTEO, Moulineaux (FR)

( * ) Notice: Subject to any disclaimer, the term of this patent is extended or adjusted under 35 U.S.C. 154(b) by 590 days.

(21) Appl. No.: 14/233,463

(22) PCT Filed: Jul. 19, 2011

(86) PCT No.: PCT/IB2011/001870
§ 371 (c)(1),
(2), (4) Date: Jan. 17, 2014

(87) PCT Pub. No.: WO2013/011343
PCT Pub. Date: Jan. 24, 2013

(65) Prior Publication Data
US 2014/0163710 A1     Jun. 12, 2014

(51) Int. Cl.
*G06F 17/50*     (2006.01)
*G06F 19/00*     (2011.01)
*A61F 2/30*      (2006.01)

(52) U.S. Cl.
CPC .......... *G06F 17/50* (2013.01); *G06F 17/5004* (2013.01); *G06F 2217/06* (2013.01)

(58) Field of Classification Search
CPC .. A61C 7/002; A61C 7/08; A61C 7/00; G06F 17/50; A61F 2/30942; A61F 2/3859; A61F 2002/30952
See application file for complete search history.

(56) References Cited

U.S. PATENT DOCUMENTS

| 6,772,026 B2* | 8/2004 | Bradbury | B29C 41/52 607/1 |
| 8,369,925 B2* | 2/2013 | Giesel | A61N 5/1049 600/407 |
| 8,538,570 B2* | 9/2013 | Stanhope | G01B 5/008 382/154 |

(Continued)

OTHER PUBLICATIONS

A. Law, How to build valid and credible simulation models, Dec. 2009, 10 pages.*
Bai et al., Semantic-based partial retrieval of CAD models for design reuse, Oct. 2009, 6 pages.*

(Continued)

*Primary Examiner* — Thuy Dao
(74) *Attorney, Agent, or Firm* — Miller, Matthias & Hull LLP

(57) ABSTRACT

A method for creating personalized objects having a mechanically functional portion the method comprising at least one step of editing a three-dimensional model (10; 11) using computer program and a step of transforming the model into a physical object using a rapid prototyping machine, wherein during the editing step: a computer program processes a deformation of the original model into a deformed model, a three-dimensional geometrical constraints database, associated with said models, provides a set of constraints on the geometry of said mechanically functional portions, and a computer program computes at least one step of comparison between some geometrical constraints from said database and a model selected between the original model and the deformed model.

12 Claims, 3 Drawing Sheets

(56) References Cited

U.S. PATENT DOCUMENTS

| | | | | |
|---|---|---|---|---|
| 8,926,627 B2* | 1/2015 | Iannotti | ................. | A61F 2/4657 |
| | | | | 606/102 |
| 9,201,988 B2* | 12/2015 | Stanhope | ................ | G01B 5/008 |
| 2008/0222568 A1* | 9/2008 | Okuwaki | ................. | G06F 17/50 |
| | | | | 715/825 |
| 2009/0208113 A1* | 8/2009 | Bar | ........................ | A43D 1/022 |
| | | | | 382/199 |
| 2010/0169185 A1 | 7/2010 | Cottingham | | |
| 2010/0169837 A1* | 7/2010 | Hyndman | ............ | G06F 3/04815 |
| | | | | 715/848 |
| 2011/0029907 A1* | 2/2011 | Bakhash | ............. | G06F 3/04815 |
| | | | | 715/769 |
| 2012/0180341 A1* | 7/2012 | Crowley, II | .......... | A43B 1/0009 |
| | | | | 36/103 |
| 2014/0149072 A1* | 5/2014 | Rutschmann | .......... | A43D 1/022 |
| | | | | 702/167 |
| 2014/0228860 A1* | 8/2014 | Steines | ............... | A61F 2/30942 |
| | | | | 606/130 |
| 2015/0382123 A1* | 12/2015 | Jobani | ................. | H04R 1/1016 |
| | | | | 700/98 |

OTHER PUBLICATIONS

Jota et al., Constructing virtual 3D models with physical building blocks, May 2011, 6 pages.*

Search report for related International Publication No. PCT/IB2011/001870; report dated Jan. 24, 2013.

Kiyokawa K et al: "SeamlessDesign: a face-to-face collaborative virtual/augmented environment for rapid prototyping of geometrically constrained 3-D objects", Multimedia Computing and Systems, 1999. IEEE International Conference on Florence, Italy Jun. 7-11, 1999, Los Alamitos, CA, USA, IEEE Comput. Soc, US, vol. 2, Jun. 7, 1999 (Jun. 7, 1999), pp. 447-453, XPO10519431, DOI: 10.1109/MMCS.1999.778493 ISBN: 978-0-7695-0253-3 p. 447-p. 452.

Kiyokawa: "SeamlessDesign for 3D object creation", IEEE Multimedia, vol. 7, No. 1, Jan. 1, 2000 (Jan. 1, 2000), pp. 22-23, XP55024025, ISSN: 1070-986X, DOI: 10.1109/93.839308 p. 22-p. 31.

Wing-Shing Tang et al: "Constraints Based Deformation", Dec. 13, 2010 (Dec. 13, 2010), Manufacturing Automation (ICMA), 2010 International Conference on, IEEE, Piscataway, NJ, USA, p. 87-93, XP031855239, ISBN: 978-1-4244-9018-9 p. 91 figure 10.

* cited by examiner

METHOD FOR CREATING PERSONALIZED FUNCTIONAL OBJECTS, COMPUTER, COMPUTER READABLE MEDIUM AND COMPUTER PROGRAM RELATED THERETO

CROSS-REFERENCE TO RELATED APPLICATIONS

This application is a 35 USC §371 U.S. national stage filing of International Patent Application No. PCT/IB2011/001870 filed on Jul. 19, 2011.

FIELD OF THE DISCLOSURE

The instant invention relates to methods allowing a user or a group of users to create personalized functional objects using a computer, to computers, to computer-readable mediums and computer programs related thereto.

BACKGROUND OF THE DISCLOSURE

In particular, the instant invention is related to a method allowing users to create a single or limited quantity of personalized objects which perform specific mechanical functions in mechanically functional portions of said objects.

U.S. 2010/0169185 describes such a method in which users use a web-based program to create and edit a three-dimensional model before exporting the completed model file to an off-site rapid-prototyping location for production and shipping of the physical object.

When said physical object has to perform a specific mechanical function such as maintaining its integrity mechanically cooperating with another object, like for example a doorknob, a car shift knob or a handle, user editing possibilities have to be dramatically reduced in order to keep the finished object functional. In the method described in document U.S. 2010/0169185, for instance, for personalization purposes, users are only allowed to choose surface colors or textures, or to add a predefined model of another object to the currently edited object.

Another possibility consists in using computer-aided design (CAD) softwares which are typically large stand-alone programs that need to be installed on a computer and require substantial education to use. Such softwares usually are not accessible to the public at large.

The instant invention has notably for object to mitigate those drawbacks by providing users with a simple and easy-to-learn way to create extensively personalized functional objects. Some embodiments of the invention also provide ways for multiple users to create collaborative personalized objects.

SUMMARY OF THE DISCLOSURE

To this aim, according to the invention, such a method for creating personalized objects having mechanically functional portions, comprises a step of editing a three-dimensional model using a computer program and a step of transforming the model into a physical object using a rapid prototyping machine, is characterized in that during the editing step:

a computer program processes a deformation of the original model into a deformed model, a three-dimensional geometrical constraints database, associated with said models, provides a set of constraints on the geometry of said mechanically functional portions, and a computer program computes at least one step of comparison between some geometrical constraints from said database and a model selected between the original model and the deformed model.

With these features, users can personalize the object by deforming its shape while geometrical constraints ensure that the final physical object will be able to perform its designated mechanical function.

In some embodiments, the constraints database can comprises one or a combination of the following constraints:

a three-dimensional mesh defining regions of the physical object that should be empty of matter, a three-dimensional mesh defining regions of the physical object that should be filled with matter, and a three-dimensional mesh defining regions of the physical object that should contain at least a determined quantity of matter.

In a specific embodiment, at least one step of comparison is followed by the step of sending the user a warning message if at least one of the constraints is not fulfilled by the model.

In another embodiment, at least one step of comparison is followed, if at least one of the constraints is not fulfilled by the model, by the step of correcting said model to fulfill the set of constraints.

In a preferred embodiment, the editing step is performed on a web-based software.

Advantageously, the editing step can be performed by more than one user at the same time.

This allows for collaborative edition and creation of personalized objects. In particular, distant users can participate in the editing steps of the method.

In some embodiment of the instant invention, the original model does not fulfill the set of constraints.

This can prevent the distribution of a fully functional model thus keeping some specific part of the model unknown from the users which is needed, for example when some intellectual property of the model is to be kept by its creator.

Another object of the present invention is a computer programmed to allow the edition of an original three-dimensional model of a personalized object having at least one mechanically functional portion, the edited model being then transformed into a physical object using a rapid prototyping machine, said computer comprising at least a computer program allowing to process a deformation of the original model into a deformed model, a three-dimensional geometrical constraints database, associated with said models, providing a set of constraints on the geometry of said mechanically functional portions, and a computer program allowing to compute at least one step of comparison between some geometrical constraints from said database and a model selected between the original model and the deformed model.

Still another object of the present invention is a non-transitory computer-readable storage device comprising instructions which, when they are executed on a computer, perform the above editing step described above.

A further object of the present invention is a computer program which, when it is executed on a computer, performs the above described editing step.

BRIEF DESCRIPTION OF THE DRAWINGS

Other characteristics and advantages of the invention will readily appear from the following description of one of its embodiments, provided as a non-limitative example, and of the accompanying drawings.

On the drawings.

On the different Figures, the same reference signs designate like or similar elements.

DETAILED DESCRIPTION OF THE DISCLOSURE

Figure 1:
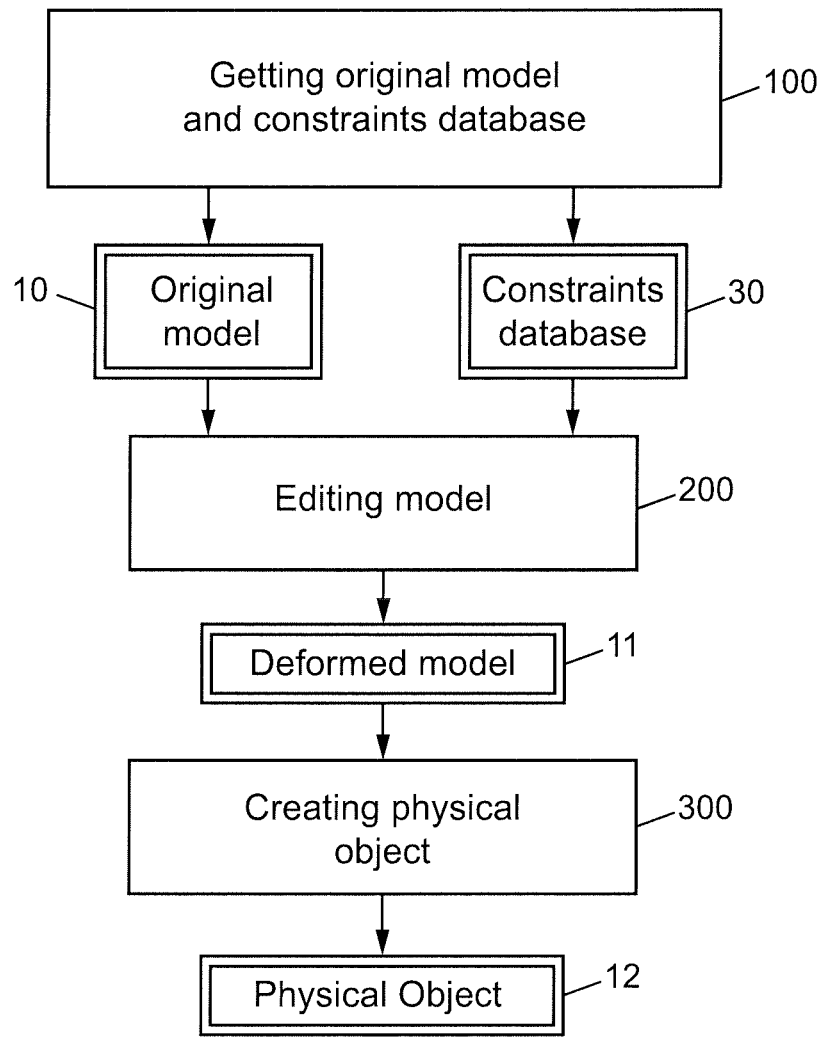
FIG. 1 is an organizational flow chart representing the steps of making a personalized functional object.

As illustrated in FIG. 1, the steps of making a personalized functional object 1 first comprises a step 100 which consists for users in retrieving an original three-dimensional model 10 of the object 1 they intend to create, as well as a geometrical constraint database 30 associated with said model 10.

The object 1 is a functional object, meaning that it has at least one mechanically functional portion 1a whose geometry in the final physical object 12 should respect some constraints if object 1 is to perform its designed function.

During a second step 200, users edit the model 10 by deforming its shape to obtain a deformed model 11. They can also change its color, texture as well as other parameters in order to freely personalize it.

A final step 300 consists in the creation of the physical object 12. A rapid-prototyping machine constructs the object 12 by interpreting deformed model 11.

In a first embodiment of the invention, a single user can perform the editing step, on a stand-alone software or through a web-browser or a web interface.

In a second embodiment of the invention, several users can edit the same model at the same time or at different times, on a stand-alone software or through a web-browser or a web interface, thus allowing for collaborative edition and creation of the personalized object.

Figure 2:
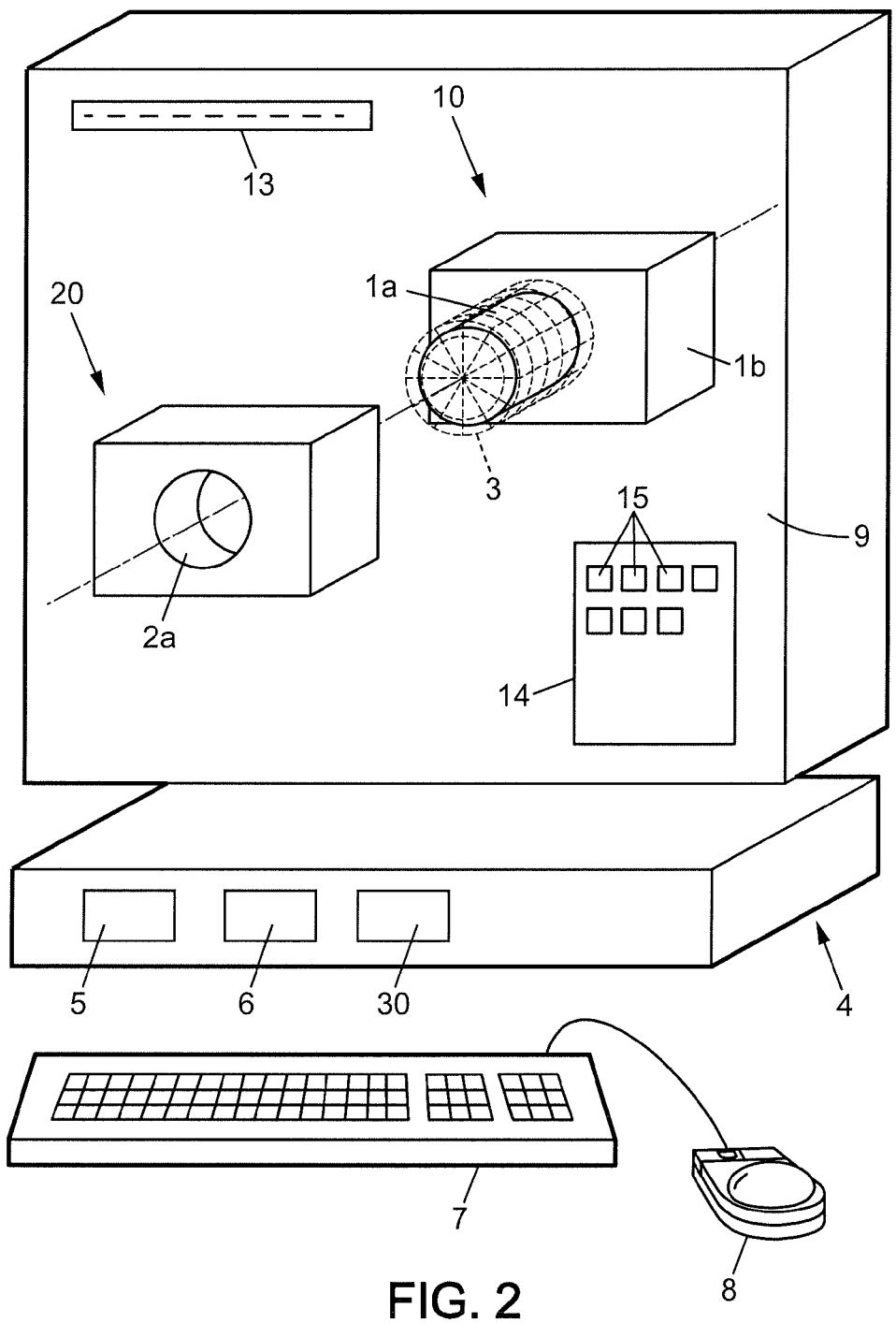
FIG. 2 shows an original model of a functional object intended to be personalized together with an associated three-dimensional constraint mesh and a model of another object.

FIG. 2 shows an original model 10 of an object 1 together with another model 20 of an object 2 that is not intended to be personalized by the user but rather to demonstrate the mechanical function of object 1.

The object 1 can be for example a door knob. It comprises a mechanically functional portion 1a intended to cooperate with the other object 2. The portion 1a for example has the shape of a cylinder on the original model 10 and is intended to be inserted in a mating hole 2a of the object 2. Object 1 also comprises a freely customizable portion 1b whose shape can be deformed at will by users without affecting the mechanical function of the object 1. On the original model 10, the portion 1b has the shape of a cube located at one end of the cylinder 1a.

The object 1 is a functional object as it comprises a portion 1a which has the specific mechanical function of being inserted in hole 2a of object 2.

The object 2 consists in a cube having a cylindrical hole 2a.

Three-dimensional geometrical constraints 3 are also shown, extracted from the geometrical constraint database 30 associated with the model 10. These constraints take the form of a three-dimensional mesh 3 shaped as a cylinder around portion 1a of the model 10. This mesh indicates regions of the physical object 12 that should be empty of matter in order for the portion 1a to perform its mechanical function: being inserted in the hole 2a of object 2.

In another embodiment of the invention, other meshes 3 can be located for example inside the portion 1a, to define regions of the physical object 12 that should be full of matter or contain at least a determined quantity of matter for the portion 1a to be functional. This determined quantity of matter can be for example needed to keep the portion 1a sufficiently rigid.

Constraints from the constraints database 30 associated with a model 10 may therefore comprise three different types of regions:
- regions which must comprise matter,
- regions which must not comprise matter, and
- regions which must comprise at least a determined quantity of matter.

In order to help the edition by the user, the constraints may not be superimposed to the model on screen, to improve visibility.

Figure 3:
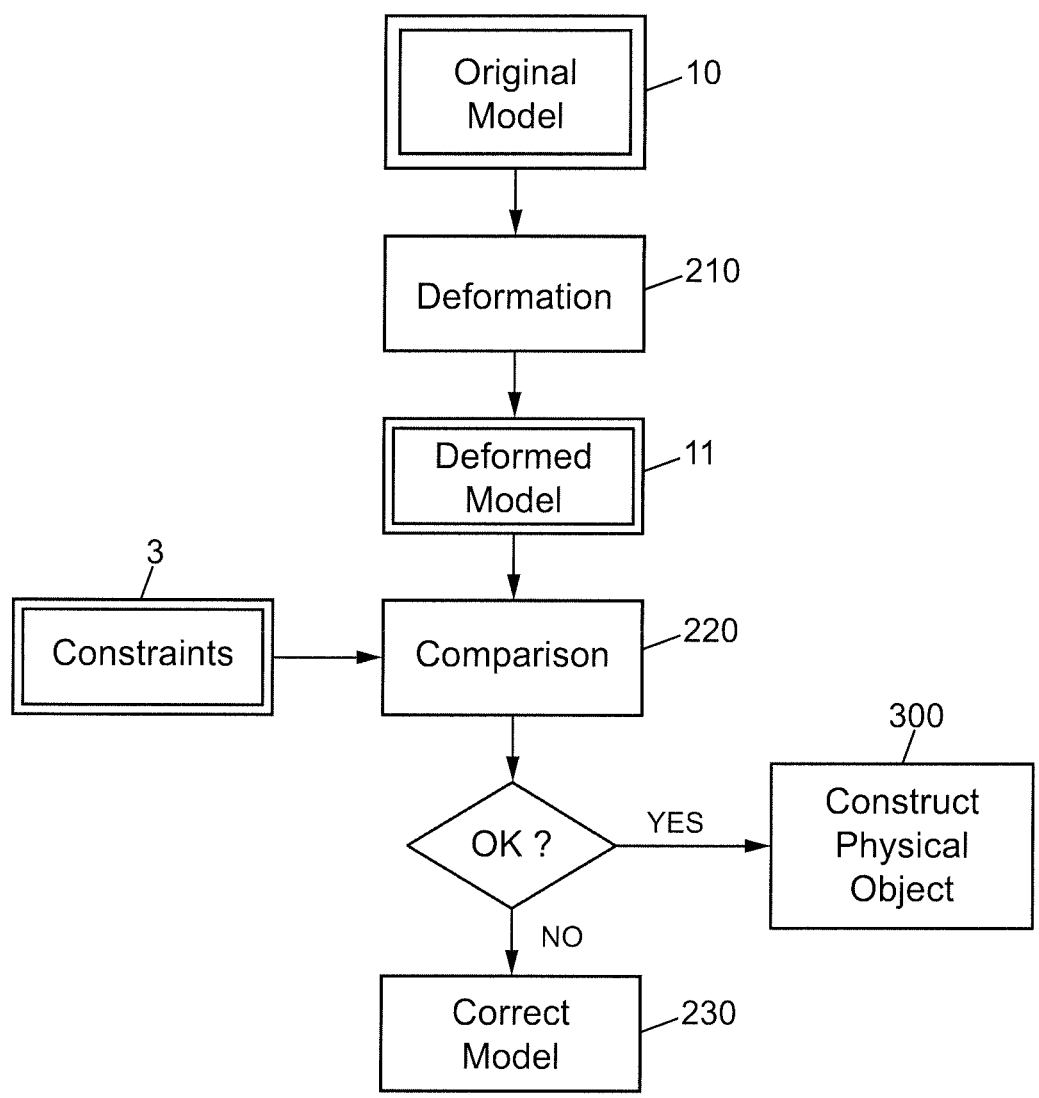
FIG. 3 is an organizational flow diagram of the editing step.

Turning now to FIG. 3, a method according to the present invention can be detailed as follow.

Starting from the original model 10 and a three-dimensional geometrical constraints database 30 associated with model 10, users are able, during a step 210 to deform the original model 10 into a deformed model 11, using a computer program 50.

As shown on FIG. 2, the program can be run through a web browser of a computer 4 having a processor 5. A database 6 of models from which the model 10 can be selected, as well as the database 30 of constraints associated to the model can be uploaded on the computer via the web. User interfaces such as keyboard 7, mouse 8 and screen 9 can be used. On the screen 9, a window showing the model under edition is shown, as well as the address of the distant website 13. A toolbox 14 comprises icons 15 useful for the present purpose, namely for editing the model, deforming it, saving and loading data, commanding transformation of the model into a physical object . . .

Following the deformation process 210, a computer program 60 performs a step of comparison 220 between the deformed model 11 and a set of geometrical constraints 3 from the database 30. If the result of this comparison is that some of the constraints 3 are not satisfied by the deformed model 11, a step 230 of correcting the model is accomplished. This step 230 can comprise adding or withdrawing matter to model 11 in order to satisfy the set of constraints 3.

In another embodiment, the step of comparison 220 can be followed by a step 240 of sending the user a warning or error message instead, or during step 210, through window 9. The warning message can be a visual message such as a warning or error box, a modification of the visual aspect of the model or a modification in the interaction permitted between a user and the model. In a variant, it can be a sound message.

In yet another embodiment of the invention, the step of comparison 220 is accomplished several times during the step 210, for example on a timely interval, after each of users' deformation of the model or only after some specific deformations of the model.

In some embodiment of the invention, the original model 10 can itself be not functional, meaning that it does not satisfy the set of constraints 3. In this embodiment, the application of step 220 and following steps 230 or 240 is essential to ensure that the final physical object 12 is functional.

Although the present invention was described by reference to a single embodiment, it will be understood that other embodiments are possible. Notably, the portion 1b can also be considered functional, as it can be actuated by a user to open a door. Constraints defining this function can also be used. Other constraints may define a minimal thickness for a device to keep its mechanical integrity, flatness for an object to be able to stand on a flat support, or the like.

The invention claimed is:

1. A method for creating personalized objects having at least one mechanically functional portion, the method comprising at least one step of editing a three-dimensional model using a computer program and a step of transforming the model into a physical object using a rapid prototyping machine, wherein during the editing step:
 - a computer program processes a deformation of the original model into a deformed model,
 - a three-dimensional geometrical constraints database, associated with said models, provides a set of constraints on the geometry of said mechanically functional portions, and
 - a computer program computes at least one step of comparison between geometrical constraints from said database and a model selected between the original model and the deformed model.

2. The method of claim 1, wherein the constraints database comprises a three-dimensional mesh defining regions of the physical object that should be empty of matter.

3. The method of claim 1, wherein the constraints database comprises a three-dimensional mesh defining regions of the physical object that should be filled with matter.

4. The method of claim 1, wherein the constraints database comprises a three-dimensional mesh defining regions of the physical object that should contain at least a determined quantity of matter.

5. The method of claim 1, wherein at least one step of comparison is followed by the step of sending the user a warning message if at least one of the constraints is not fulfilled by the model.

6. The method of claim 1, wherein at least one step of comparison is followed, if at least one of the constraints is not fulfilled by the model, by a step of correcting said model to fulfill the set of constraints.

7. The method of claim 1, wherein the editing step is performed on a web-based software.

8. The method of claim 1, wherein the editing step can be performed by more than one user at a same time.

9. The method of claim 1, wherein the original model does not fulfill the set of constraints.

10. A computer having a central processing unit (CPU) programmed to allow the edition of an original three-dimensional model of a personalized object having at least one mechanically functional portion, the edited model being then transformed into a physical object using a rapid prototyping machine, said computer comprising at least
 - a computer program stored in a memory allowing to process a deformation of the original model into a deformed model,
 - a three-dimensional geometrical constraints database, associated with said models, providing a set of constraints on the geometry of said mechanically functional portions, and
 - a computer program allowing to compute at least one step of comparison between some geometrical constraints from said database and a model selected between the original model and the deformed model.

11. A non-transitory computer-readable storage device comprising instruction which, when they are executed on a computer, perform a step of editing a three-dimensional model using a computer program and a step of transforming the model into a physical object using a rapid prototyping machine, wherein during the editing step:
 - a computer program processes a deformation of the original model into a deformed model,
 - a three-dimensional geometrical constraints database, associated with said models, provides a set of constraints on the geometry of said mechanically functional portions, and
 - a computer program computes at least one step of comparison between geometrical constraints from said database and a model selected between the original model and the deformed model.

12. A computer program stored in a memory which, when it is executed on a computer, performs a step of editing a three-dimensional model using a computer program and a step of transforming the model into a physical object using a rapid prototyping machine, wherein during the editing step:
 - a computer program processes a deformation of the original model into a deformed model,
 - a three-dimensional geometrical constraints database, associated with said models, provides a set of constraints on the geometry of said mechanically functional portions, and
 - a computer program computes at least one step of comparison between geometrical constraints from said database and a model selected between the original model and the deformed model.

* * * * *